United States Patent
Boileau et al.

(10) Patent No.: US 10,167,815 B2
(45) Date of Patent: Jan. 1, 2019

(54) THRUST REVERSER OF A TURBOFAN POD COMPRISING A SINGLE CONTROL FOR MOVABLE COWLINGS AND A VARIABLE NOZZLE

(71) Applicant: AIRCELLE, Gonfreville l'Orcher (FR)

(72) Inventors: Patrick Boileau, Tournefeuille (FR); Olivier Kerbler, Antony (FR)

(73) Assignee: AIRCELLE, Gonfreville l'Orcher (FR)

( * ) Notice: Subject to any disclaimer, the term of this patent is extended or adjusted under 35 U.S.C. 154(b) by 12 days.

(21) Appl. No.: 15/290,115

(22) Filed: Oct. 11, 2016

(65) Prior Publication Data

US 2017/0298870 A1  Oct. 19, 2017

Related U.S. Application Data

(63) Continuation of application No. PCT/FR2015/050777, filed on Mar. 26, 2015.

(30) Foreign Application Priority Data

Apr. 11, 2014 (FR) .................................. 14 53266

(51) Int. Cl.
  *F02K 1/72* (2006.01)
  *F02K 1/60* (2006.01)
  (Continued)

(52) U.S. Cl.
  CPC ............... *F02K 1/605* (2013.01); *F02K 1/09* (2013.01); *F02K 1/72* (2013.01); *F02K 1/763* (2013.01); *F02K 1/766* (2013.01); *F02K 1/80* (2013.01)

(58) Field of Classification Search
  CPC . F02K 1/763; F02K 1/766; F02K 1/80; F02K 1/09; F02K 1/72
  See application file for complete search history.

(56) References Cited

U.S. PATENT DOCUMENTS

| 5,794,434 A | 8/1998 | Szupkay |
| 2013/0062433 A1* | 3/2013 | Vauchel ................ B64D 29/06 239/265.19 |

(Continued)

FOREIGN PATENT DOCUMENTS

| FR | 2758161 | 7/1998 |
| FR | 2960917 | 12/2011 |

(Continued)

OTHER PUBLICATIONS

International Search Report for International Application PCT/FR2015/050777, dated Jul. 8, 2015.

*Primary Examiner* — Ted Kim
(74) *Attorney, Agent, or Firm* — Burris Law, PLLC

(57) ABSTRACT

A thrust reverser of a turbofan pod is provided that includes movable cowlings that retract relative to stationary front structure to reveal stationary or movable thrust reverser cascades, as well as a secondary variable nozzle section connected to the movable cowlings by guiding means enabling movement controlled by actuators engaged with the front structure to apply an axial thrust. The actuators are directly connected to the secondary nozzle, and in that the thrust reverser comprises latches connected to the movable cowlings, having two positions providing, alternately, latching onto the front structure or latching onto the control of the secondary nozzle.

12 Claims, 4 Drawing Sheets

Figure 1A:
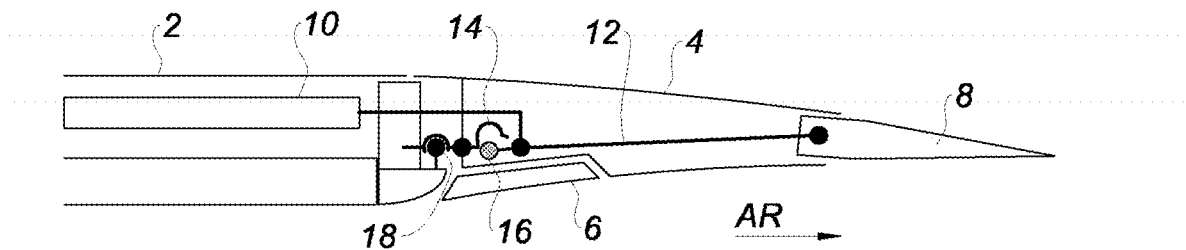

(51) Int. Cl.
*F02K 1/09* (2006.01)
*F02K 1/76* (2006.01)
*F02K 1/80* (2006.01)

(56) References Cited

U.S. PATENT DOCUMENTS

| | | | | |
|---|---|---|---|---|
| 2013/0078081 | A1* | 3/2013 | Chakkera | F02K 1/64 415/150 |
| 2013/0263600 | A1* | 10/2013 | Vauchel | F02K 1/1207 60/722 |
| 2014/0000238 | A1* | 1/2014 | Gonidec | F02K 1/09 60/226.2 |
| 2014/0076998 | A1* | 3/2014 | Marchaj | F02K 1/76 239/265.19 |
| 2014/0245716 | A1* | 9/2014 | Gonidec | F02K 1/70 60/226.2 |
| 2014/0245743 | A1* | 9/2014 | Caruel | F02K 1/625 60/771 |
| 2015/0083823 | A1* | 3/2015 | Hurlin | F16D 11/10 239/265.19 |

FOREIGN PATENT DOCUMENTS

| | | |
|---|---|---|
| FR | 2991670 | 12/2013 |
| WO | 2010/142881 | 12/2010 |
| WO | WO-2013/068664 * | 5/2013 |
| WO | 2013/102739 | 7/2013 |

* cited by examiner

THRUST REVERSER OF A TURBOFAN POD COMPRISING A SINGLE CONTROL FOR MOVABLE COWLINGS AND A VARIABLE NOZZLE

CROSS-REFERENCE TO RELATED APPLICATIONS

This application is a continuation of International Application No. PCT/FR2015/050777, filed on Mar. 26, 2015, which claims the benefit of FR 14/53266, filed on Apr. 11, 2014. The disclosures of the above applications are incorporated herein by reference.

FIELD

The present disclosure concerns a thrust reverser for an aircraft nacelle accommodating a turbojet engine, as well as an aircraft nacelle equipped with such a thrust reverser.

BACKGROUND

The statements in this section merely provide background information related to the present disclosure and may not constitute prior art.

The motorization assemblies for aircrafts generally include a nacelle forming a generally circular outer shell, comprising in the interior a turbojet engine disposed along the longitudinal axis of this nacelle. The turbojet engine receives fresh air coming from the upstream or front side, and rejects from the downstream or back side the hot gases resulting from the combustion of the fuel, which provide some thrust.

The bypass turbojet engines present, around this turbojet engine, fan blades generating an important secondary flow of cold air along an annular flow path passing between the engine and the nacelle, which adds a high thrust.

Some nacelles include a thrust reverser system which closes at least partially the annular flow path of cold air, and rejects the secondary flow forward in order to generate a braking thrust of the aircraft.

A known type of thrust reverser, presented in particular in the document FR-A1-2758161, includes rear movable cowls called "Trans-cowl," sliding axially rearward under the effect of cylinders by deploying flaps in the annular flow path in order to close for the most part this flow path. The flaps return the cold air flow radially outward by passing through cascade vanes uncovered by the movable cowls during their sliding movements, comprising blades which direct this flow forward.

Furthermore, some nacelles include a secondary rear nozzle called "Variable Fan Nozzle" (VFN), providing a secondary variable flow thanks to a translational movement of this nozzle which is connected to the movable cowls of the thrust reverser by guide means allowing an axial movement of the control system.

An actuation system known to the thrust reverser as well as to the variable secondary nozzle, include cylinders fixed on one side to the front fixed structure and on the other side to the secondary nozzle disposed at the rear, these cylinders pass through the entire structure of the movable cowls of the thrust reverser located axially between these two portions. The nacelle also includes two independent controlled locks, a fixed lock linking the front structure to the cowls, and a movable lock linking these cowls to the secondary nozzle.

By actuating the cylinders rearward, only a decrease of the secondary nozzle is obtained if the movable lock is open and the fixed lock is closed, and a deployment of the thrust reverser together with the nozzle if, conversely, the fixed lock is open and the movable lock is closed.

A problem which arises with this actuation system is that, for controlling the movable cowls, the axial thrust reversers developed by the cylinders are directly applied to the secondary nozzle disposed rearward, which then transmits these forces forward to the movable cowls by the movable lock. It is then necessary to size the secondary nozzle in order to transmit these constraints, thereby forcing to provide for additional masses.

SUMMARY

The present disclosure provides a thrust reverser of a bypass turbo engine nacelle, comprising movable cowls which move backwards relative to a front fixed structure in order to uncover fixed or movable cascade vanes of thrust reverser, as well as a variable secondary nozzle connected to the movable cowls by guide means allowing a controlled displacement by cylinders bearing on the front structure in order to apply an axial thrust, characterized in that the cylinders are directly connected to the secondary nozzle, and in that the thrust reverser includes locks linked to the movable cowls, comprising two positions causing alternately a locking onto the front structure or a locking onto the control of the secondary nozzle.

An advantage of this thrust reverser is that, for actuating the cowls, the forces developed by the cylinders are transmitted directly to these cowls by passing through the locks in the position causing the locking onto the control of the secondary nozzle, which avoids making the constraints pass in this nozzle.

Moreover, the locks comprising only two positions, are simple to control by a single actuator providing these two positions.

The thrust reverser according to the present disclosure may further include one or more of the following feature(s), which can be combined together.

According to one form, the locks are tilting in order to take their two positions, which represents a simple construction mode.

The locks positioned on the movable cowl can be controlled from the front fixed structure.

In particular, each titling lock may include a central pivot linked to the movable cowls, and axially on either side, an attachment device which can be fixed, one to the front structure and the other to the control of the secondary nozzle.

According to another form, the locks are mounted on an axis pivoting by about 90° to take their two positions, which represents a second simple construction mode.

In particular, each lock may include an axis disposed longitudinally in the nacelle, guided in rotation by an element linked to the movable cowls, including at each end, attachment device that can be fixed, alternately, one to the front structure and the other to the control of the secondary nozzle.

Advantageously, the thrust reverser includes a movable part forming safety which keeps the locking of the lock in each position. Safety is then provided in a simple manner by avoiding a release of the locking.

The movable safety part can be a drawer guided by an element linked to the movable cowls, including a sliding movement for locking the lock alternately in one of its two positions.

In this case, the movable safety part is advantageously controlled by the actuator which moves the lock, a clearance being interposed between this actuator and this lock in order to allow a displacement of the movable part before moving the lock. Thus, a simple kinematics which avoids risks of locking the operation is carried out.

Advantageously, the locking devices include resilient return means providing two locking and unlocking stable positions. These resilient means allow in a simple and inexpensive manner to ensure these stable positions.

Optionally, the locks positioned on the movable cowl can be controlled from the front fixed structure and lock only the variable secondary nozzle relative to the movable cowl.

The present disclosure also provides a turbojet engine nacelle including a thrust reverser comprising any one of the preceding features.

Further areas of applicability will become apparent from the description provided herein. It should be understood that the description and specific examples are intended for purposes of illustration only and are not intended to limit the scope of the present disclosure.

DRAWINGS

Figure 1B:
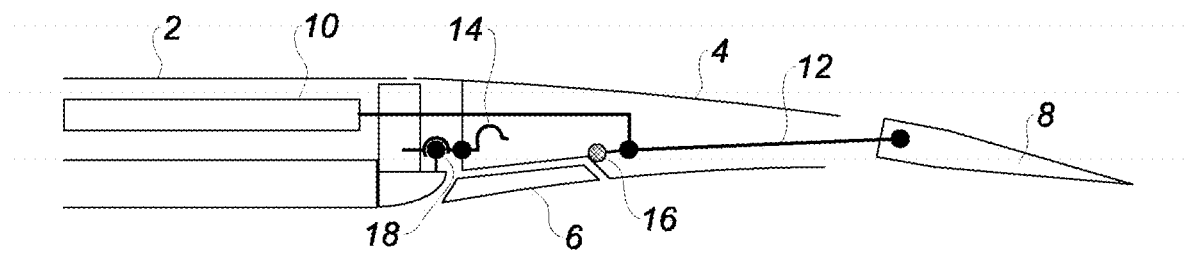
Figure 1C:
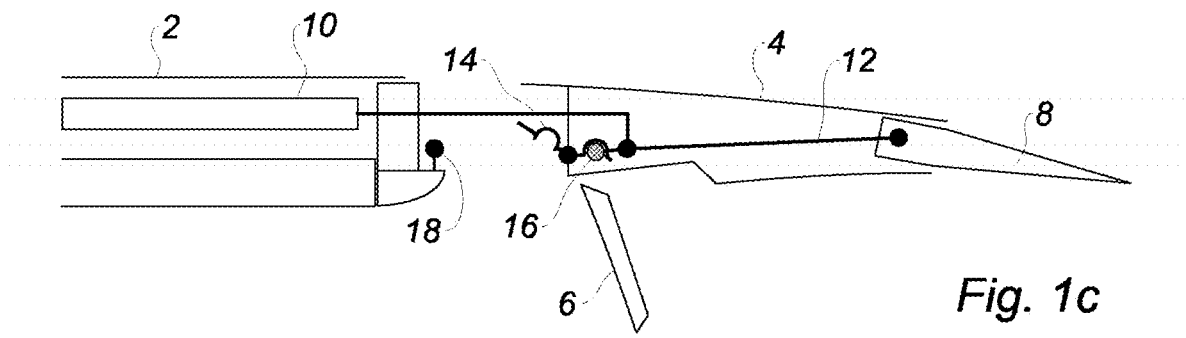

In order that the disclosure may be well understood, there will now be described various forms thereof, given by way of example, reference being made to the accompanying drawings, in which:

FIGS. 1a, 1b and 1c are diagrams in axial section of a thrust reverser according to the present disclosure, presented successively in closed position with the retracted then deployed secondary nozzle, and in open position;

FIGS. 2a, 2b, 2c, 2d and 2e are views of a tilting lock for this thrust reverser, presented successively, with a locking onto the front structure, the nozzle being retracted then deployed, during the tilting of the locking, and with a locking onto the cylinder, the cowls being closed then open; and FIGS. 3a, 3b, 3c and 3d are views of a rotary lock for this thrust reverser, presented successively with a locking onto the front structure, the nozzle being retracted then deployed, during rotation, and with a locking onto the cylinder, the cowls being open.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows the rear portion of a jet engine nacelle, the rear axial direction being indicated by the arrow "AR", comprising a front fixed structure 2, and movable cowls 4 fitted rearward of this structure.

Each cowl 4 is connected to the front structure 2 by longitudinal guide means, which allow a rearward sliding of these cowls in order to open the passage of the secondary flow radially outward, and to lower flaps 6 closing the outlet rearward, and returning the flow toward these passages comprising non represented thrust reverser cascade vanes.

A secondary nozzle 8 disposed at the rear of the nacelle, is connected to the cowls 4 by axial guide rails allowing a position retracted forward shown in FIG. 1a, and a position deployed rearward shown in FIG. 1b which improves the yields for the high rotation speeds of the turbojet engine.

Cylinders 10 axially disposed in the front structure 2 include a body fixed to this front structure, and a stem projecting rearward which is directly connected to the secondary nozzle 8 by an axial control rod 12 passing through the cowls 4 in their lengths.

A tilting lock 14 linked by a central pivot to the cowls 4, includes two locking stable positions comprising alternately a front hook engaged on a front stud 18 fixed to the front structure 2, or a rear hook engaged on a rear stud 16 fixed to the control rod 12.

FIGS. 1a and 1b show the tilting lock 14 with its engaged front hook, which links the cowls 4 to the front structure 2. We can then control only the deployment of the nozzle 8, with the decrease of the cylinder 10 as shown in figure 1b.

FIGS. 1c shows the tilting lock 14 with its rear hook engaged, which detaches the cowls 4 from the front structure 2 and fix them to the nozzle 8. The actuation of the cylinder 10 then causes the decrease of the assembly formed by the cowls 4 and the nozzle 8.

Thus, a control of two different movements which improves the force paths is made with a simple and compact actuator in order not to apply unnecessary constraint on the elements. In particular, a weighted connection between the cylinder 10 and the variable nozzle 8 is obtained in direct flow mode, which allows controlling the stroke and the stops of the movements of this nozzle, as well as a direct connection between the cylinder and the movable structure of the thrust reverser.

Figure 2A:
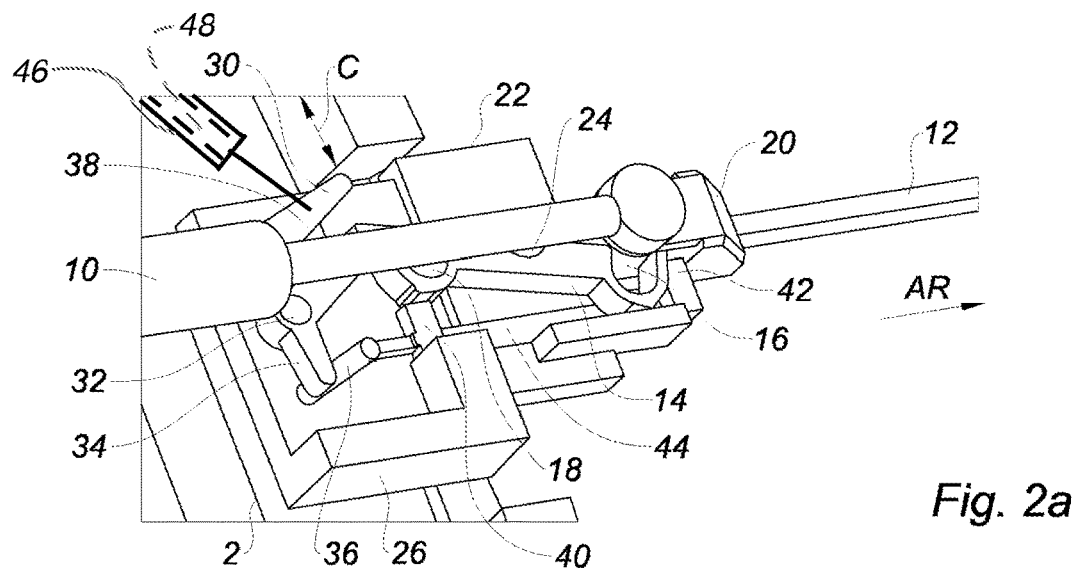

FIG. 2a shows a titling lock 14 which tilts about a pivot 24 perpendicular to the axis of the nacelle, fixed on an element 22 of the axially sliding structure with the movable cowls.

The lock 14 lying along the axis of the nacelle, includes symmetrically on either side of its pivot 24, a rear hook which can be engaged on a rear stud 16 as part of a fixation 20 connecting the end of the stem of the cylinder 10 to the control rod 12, and a front hook which can alternately be engaged on a front stud 18 fixed to a support 26 linked to the front structure 2.

The lock 14 includes at its front end a tip projecting from the hook, which is engaged between two parallel arms 30 each mounted on a pivot 32 fixed on the support 26, which are interconnected by a cross-member 38 mounted on joints in order to allow an inclination of these arms while maintaining their parallelism.

One of the arms 30 includes at its pivot 32 a substantially perpendicular elbow 34, terminating with a hinged connecting rod 36 which is connected to a drawer 44 guided both in the support 26 and in the element 22 linked to the movable cowls, in order to allow only a sliding movement along the axis of the nacelle without being able to laterally move away from the lock 14.

The arms 30 pivot under the effect of an actuator 46 performing a transverse movement according to the arrow "C", in order to fix two stable end positions corresponding to the two locking positions of the lock. This pivoting of the arms 30 causes a titling of the lock 14 comprising its engaged tip between these arms with a large clearance, as well as a sliding movement of the drawer 44 driven by the connecting rod 36, which includes a front pad 40 and rear pad 42 directed toward each of the hooks corresponding to this lock.

The operation of the lock is as follows.

FIG. 2a shows the front hook engaged on the stud 18 of the front structure 2, the axially guided drawer 44 having slid rearward so as to adjust its front pad 40 to the back of this hook, which prevents an accidental release from the hook which is thus locked on its stud.

Figure 2B:
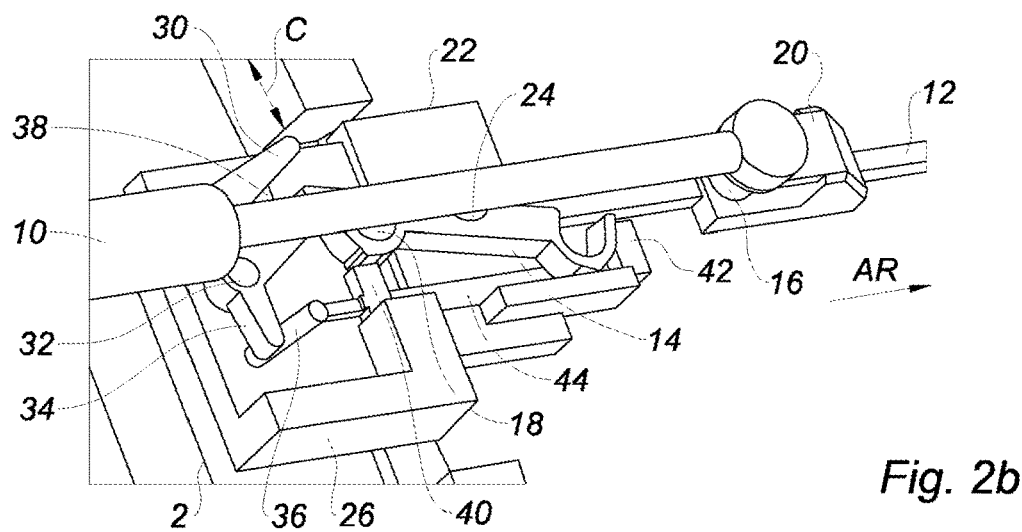

With the lock 14 held in this position, FIG. 2b shows the cylinder 10 which deploys the secondary nozzle by a decrease of its stem driving the control rod 12 through the fixation 20. The structure of the movable cowls remains securely attached to the front structure 2, thanks to the drawer 44, which maintains the position of the lock 14.

Figure 2C:
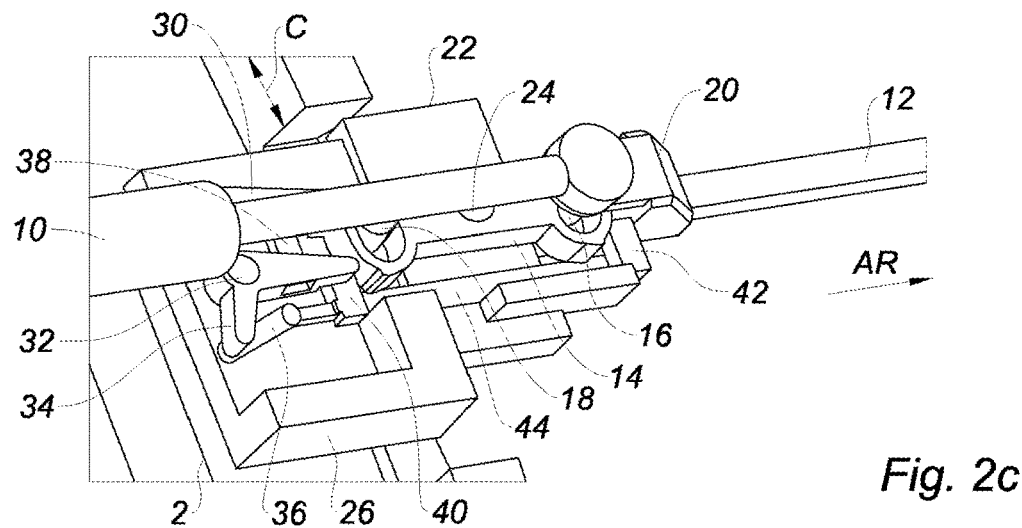

The cylinder 10 as well as the secondary nozzle being retracted, FIG. 2c shows the arms 30 being pivoted under the effect of their actuator 46, starting by performing a forward sliding of the drawer 44 thereby unlocking the front hook of the lock 14 by the release of the front stud 40. The clearance between the front tip of the lock 14 and the two arms 30 allow starting to pivot these arms as well as the sliding movement of the drawer 44, before starting to tilt this lock.

Figure 2D:
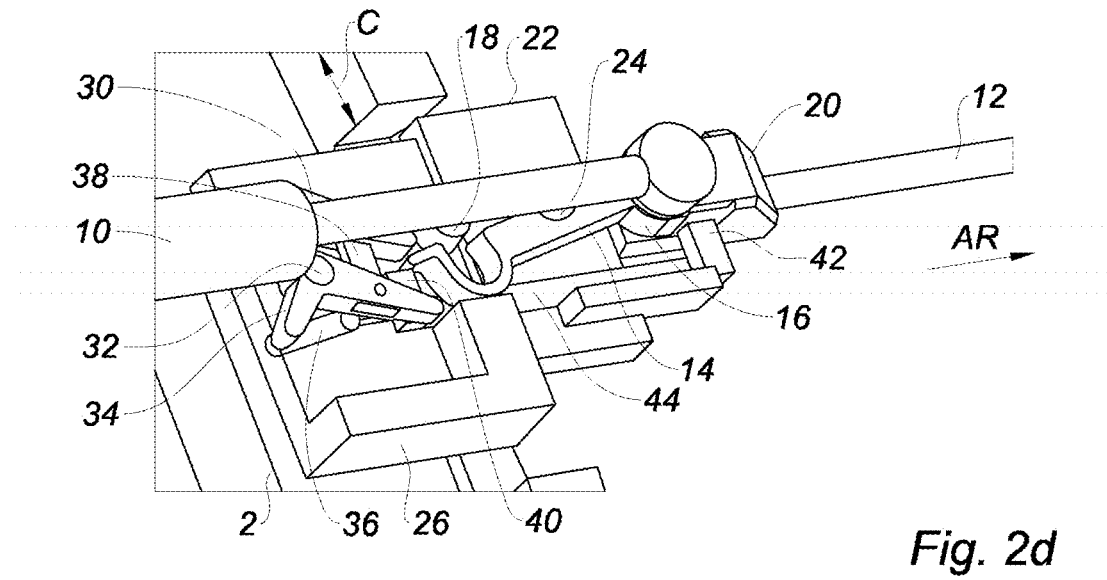

FIG. 2d shows the end of the tilting of the lock 14, the rear pad 42 facing the rear hook, which locks the position comprising the detachment of the movable cowls from the front structure 2, and their reattachments in a safety manner to the rod 12 controlling the nozzle.

Figure 2E:
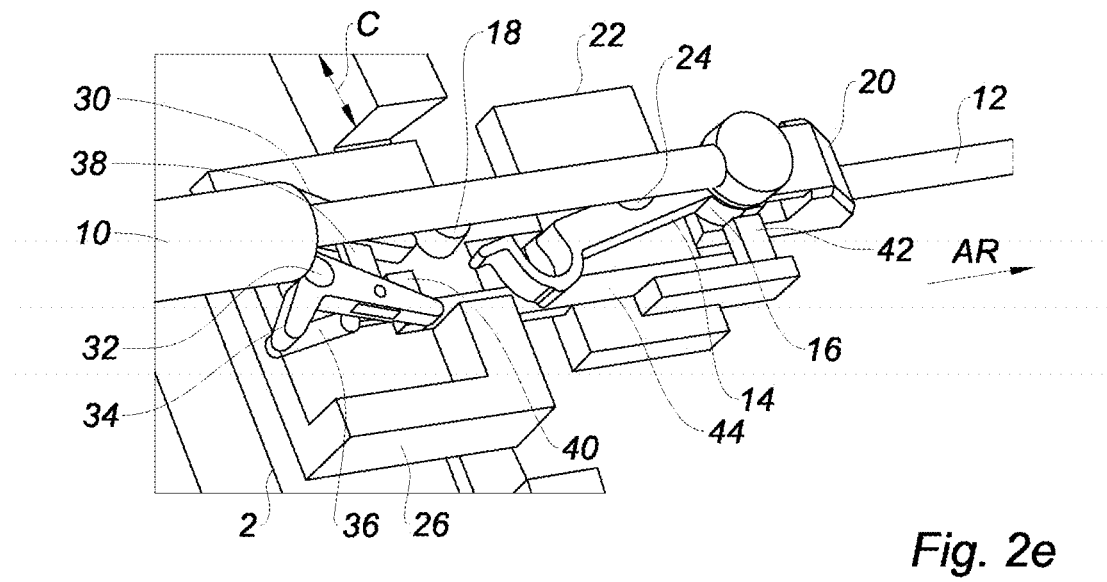

Then, as shown in FIG. 2e, the cylinder 10 can be actuated to decrease both the movable cowls and the secondary nozzle.

Advantageously, the lock 14 or its actuator 46 include a a resilient member (e.g., spring 48) which, during a movement of the lock, is first compressed then expanded in order to provide two stable end positions corresponding to the two locking positions of this lock.

Figure 3A:
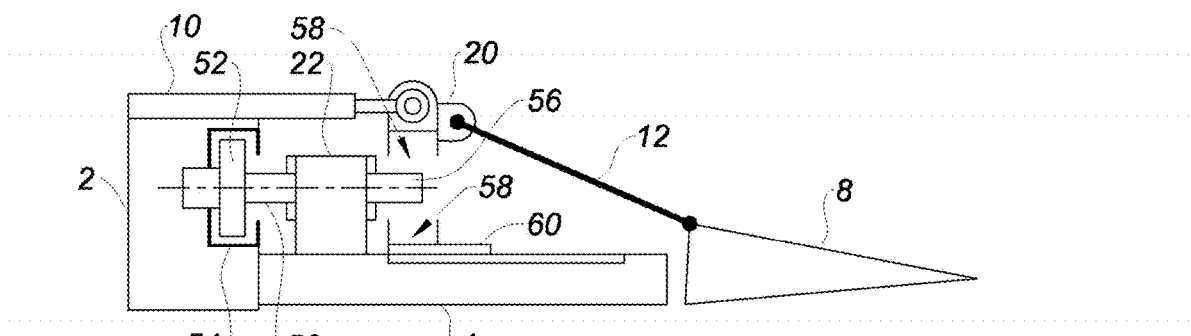

FIG. 3a shows the lock 50 formed by an axis disposed longitudinally in the nacelle, guided in rotation by an element 22 of the structure linked to the movable cowls, including at each end a front 52 or rear 56 transverse bar which are disposed perpendicularly relative to each other.

The front bar 52 binds to the front structure 2 when it is vertical, by being engaged in upper and lower hooks 54 of this structure. Similarly, the rear bar 56 binds to the cylinder 10 when it is vertical by engaging in an upper hook 58 of the fixation 20, this bar being also engaged in a lower hook 58 mounted on a slide 60 fixed on the movable cowls 4.

Thus, a 90° rotation of the axis of the lock 50 is carried out by putting a vertical bar to engage it in the two hooks on its side, a locking of the movable cowls 4 with alternately the front structure 2 or the secondary nozzle 8, the other horizontal bar can slide freely in front of the hooks corresponding to its side.

The operation of the lock is as follows.

Figure 3B:
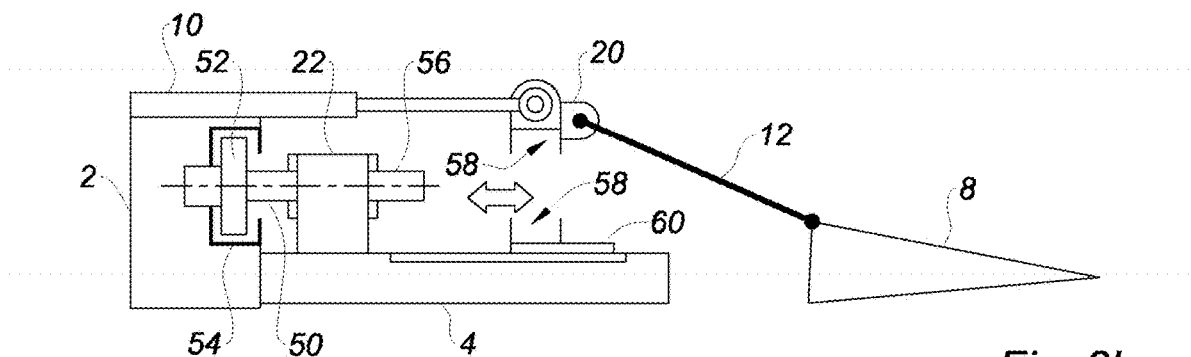

FIG. 3a shows the axis of the lock 50 engaged on the hooks 52 of the front structure 2, and released from the hook 58 linked to the cylinder 10. Then, only the secondary nozzle 8 is operated as shown in FIG. 3b, by leaving the movable cowls 4 fixed to the front structure 2.

Figure 3C:
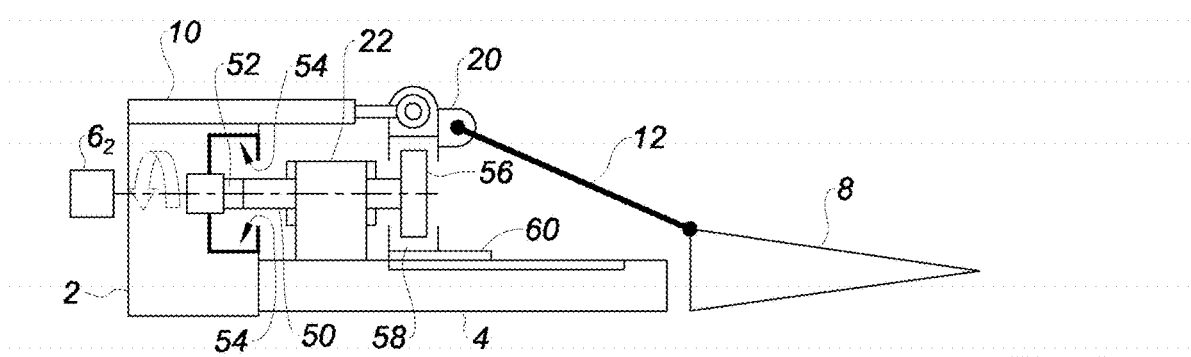

The cylinder 10 as well as the secondary nozzle being retracted, FIG. 3c shows the axis of the lock 50 pivoting under the effect of an actuator 62, thereby releasing the front bar 52 from its hooks 54 and engaging the rear bar 56 in the hook 58 linked to the cylinder 10.

Figure 3D:
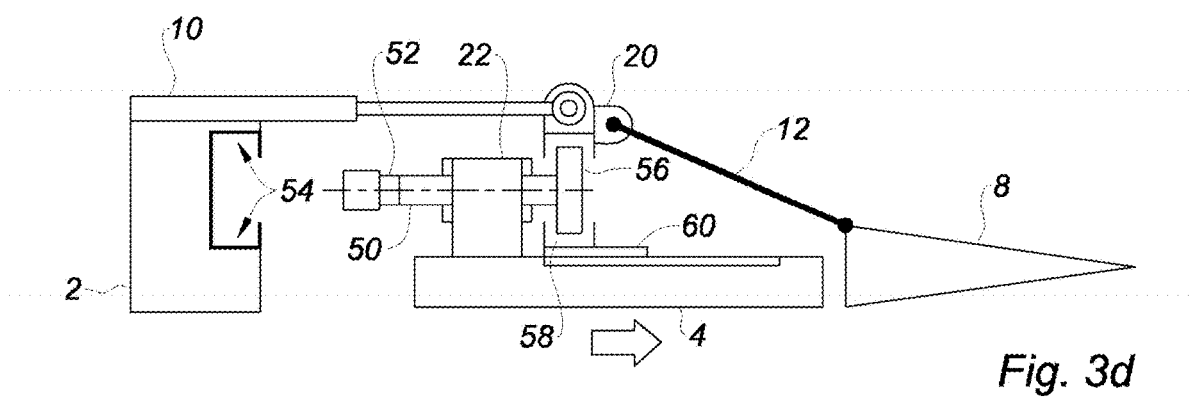

Then, the movable cowls 4 are detached from the front structure 2, then, the assembly formed by these movable cowls and the secondary nozzle 8 is operated at the same time, as shown in FIG. 3d.

What is claimed is:

1. A thrust reverser of a bypass turbojet engine nacelle comprising:
    movable cowls which move backwards relative to a front fixed structure in order to uncover fixed or movable cascade vanes of the thrust reverser;
    a variable section secondary nozzle connected to the movable cowls by axial guide rails;
    cylinders mounted on the fixed front structure in order to effect a controlled axial displacement of both the movable cowls and the secondary nozzle, wherein the cylinders are directly connected to the secondary nozzle; and
    locks positioned on and moving with the movable cowls, each one of the locks comprising two positions, controlled by an actuator, causing alternately a locking onto the front fixed structure or a locking onto a control member of the secondary nozzle.

2. The thrust reverser according to claim 1, wherein the locks tilt in order to take the two positions.

3. The thrust reverser according to claim 2, wherein the locks are controlled from the front fixed structure.

4. The thrust reverser according to claim 3, wherein each lock includes a central pivot linked to the movable cowls, and axially on each side of each lock, an attachment device that is fixed, one to the front fixed structure, and the other to the control member of the secondary nozzle.

5. The thrust reverser according to any of claim 1, wherein the locks are mounted on a pivot axis for rotation over about 90° about the pivot axis in order to take their two positions.

6. The thrust reverser according to claim 5, wherein each lock defines an axis longitudinally disposed in the nacelle, guided in rotation by an element linked to the movable cowls, including at each end, an attachment device which can be alternately fixed, one to the front fixed structure and the other to the control member of the secondary nozzle.

7. The thrust reverser according to claim 1 further comprising a movable part forming a safety which maintains locking of the lock in each of the two positions.

8. The thrust reverser according to claim 7, wherein the movable part is a drawer guided by an element linked to the movable cowls, including a sliding movement for locking the lock alternately in one of the two positions.

9. The thrust reverser according to claim 7, wherein the movable part is controlled by the actuator which moves the lock, a clearance being interposed between the actuator and the lock in order to allow a displacement of the movable part before moving the lock.

10. The thrust reverser according to claim 1, wherein the locking of the locks includes a resilient member providing two locking and unlocking stable positions.

11. The thrust reverser according claim 1, wherein the locks positioned on the movable cowl can be controlled from the front fixed structure and lock only the variable secondary nozzle relative the movable cowl.

12. A nacelle of a turbojet engine including a thrust reverser according to claim 1.

* * * * *